F. H. PRITCHARD.
POWER TRANSMISSION AND ELECTRIC BRAKING.
APPLICATION FILED SEPT. 11, 1920.
1,421,828.
Patented July 4, 1922.
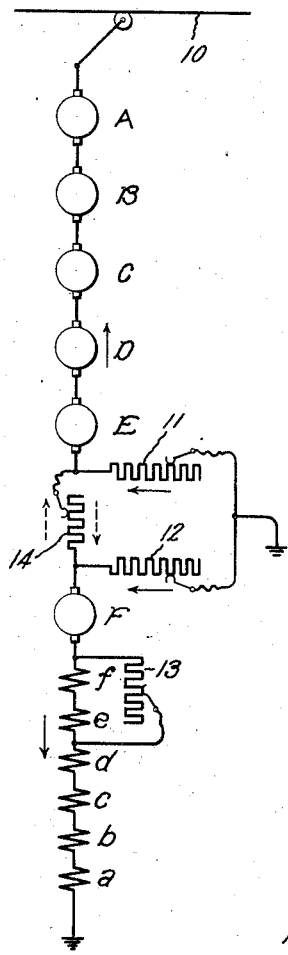
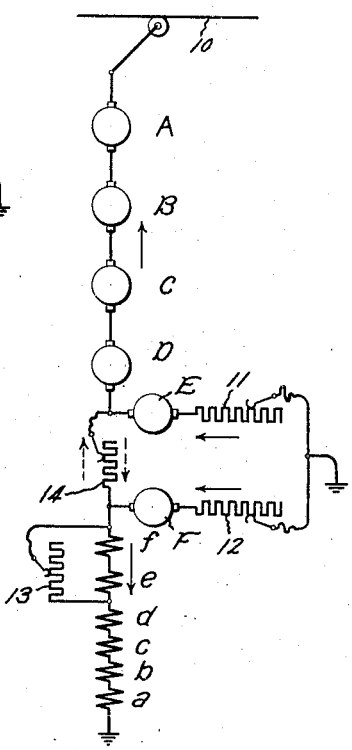
Inventor:
Franklin H. Pritchard,
by Albert G. Davis
His Attorney.

UNITED STATES PATENT OFFICE.

FRANKLIN H. PRITCHARD, OF SCHENECTADY, NEW YORK, ASSIGNOR TO GENERAL ELECTRIC COMPANY, A CORPORATION OF NEW YORK.

POWER TRANSMISSION AND ELECTRIC BRAKING.

1,421,828. Specification of Letters Patent. Patented July 4, 1922.

Application filed September 11, 1920. Serial No. 409,639.

*To all whom it may concern:*

Be it known that I, FRANKLIN H. PRITCHARD, a citizen of the United States, residing at Schenectady, county of Schenectady, State of New York, have invented certain new and useful Improvements in Power Transmission and Electric Braking, of which the following is a specification.

My invention relates to systems of power transmission and electric braking, and in particular to systems wherein a plurality of dynamo electric machines are caused to operate as motors to drive a load or as generators driven by the load to retard the load.

Although not limited to such use, my invention has a particular usefulness in the control of the electric driving motors of an electric vehicle, such for instance as an electric locomotive or the like. In particular, my invention relates to that type of electric braking in which a portion of the machines operates as an exciter for the remainder of the machines. Furthermore, my invention relates to improvements in the system of braking described and claimed in a copending application of Asa F. Batchelder, Serial No. 409,647, filed September 11, 1920, this invention being assigned to the same assignee as the copending Batchelder application.

One of the objects of my invention is to provide a system of braking of the general type described and claimed in the aforesaid Batchelder application in which inherent means is provided whereby desirable speed-torque conditions may be obtained over a wide range of operating speeds.

Other objects of my invention will appear from a description of the invention. For a better understanding of my invention, reference is had to the accompanying drawings, in which Fig. 1 is a very simplified diagram of one form of my invention, and Fig. 2 is a very simplified diagram of the preferred form of my invention.

Referring to the drawings, the dynamo electric machines having armatures A, B, C, D, E, and F and corresponding field windings $a$, $b$, $c$, $d$, $e$ and $f$ are operatively connected to each other and to a supply circuit designated by the trolley wire 10. It will be understood that the ground connection shown is the other side of the supply circuit. The dynamo electric machine comprising the armature F and field $f$ operates as a self-excited exciter supplying the excitation for the dynamo electric machines. This exciter is connected in a closed loop or local circuit with the field windings, and a resistance is included in the closed loop. This resistance comprises resistors 11 and 12 which I shall designate as "balancing" resistors, and the resistor 14 which I shall designate as an "equalizing" or "stabilizing" resistor. The armatures A, B, C, D and E of the remainder of the machines are connected in series with each other and in series with that portion of the closed loop or local circuit which includes the resistors 11 and 12, so that the braking current flows through these resistors 11 and 12, but only the excitation current flows through the armature of the exciter and the field windings of the machines. The field winding $f$ of the exciter and the field winding $e$ are shunted by means of a variable resistor 13 which provides means whereby the braking effect may be very nicely controlled at the will of the operator.

It will be understood that I contemplate that the dynamo electric machines may be used as series wound motors to drive a load, and that the motors may be connected in any desired relation, such as series, series parallel or parallel for propelling the load. I have not shown any controller and connections whereby the machines may be connected in various relations for motoring or connected as shown for braking, for the reason that those skilled in the art will readily supply a controller and connections whereby any desired relation of the machines may be effected. The essence of my invention resides in the braking connections, and in particular to the provision of the equalizing or stabilizing resistor 14 which establishes a multiple connection for the balancing resistors 11 and 12 at the high potential ends of the balancing resistors.

The balancing resistors have important functions, as fully pointed out in the above mentioned Batchelder application. Among these functions may be mentioned that of limiting the rush of current which flows through the armatures A, B, C, D and E when the machines are connected to the source of supply due to fluctuations in the supply voltage. They also provide a means for fully loading the exciter portion of the machines and for proportioning the current flowing through the excitation circuit and the braking circuit. Another important function is that of inherently compensating for fluctuations of line potential. Thus, a substantial decrease in line potential will cause the machines to deliver momentarily a greater amount of current to the supply circuit. This will produce an increased voltage drop across the resistors 11 and 12, and thereby reduce the current flowing in the excitation circuit and reduce the current in the exciter field circuit, which further reduces the excitation current. A balance will be very promptly effected and a stable condition reached in a very short time by reason of the inherent compensating effect of the arrangement.

The function of the equalizing or stabilizing resistor 14 will now be explained. If the resistance of the balancing resistors 11 and 12 is made sufficiently high so as to provide the necessary resistance in circuit with the armatures A, B, C, D and E and the supply circuit, and if the resistance of these two resistors were sufficiently high to cause the machine operating as an exciter (armature F and field $f$) to be fully loaded, the compensating effect of these resistors would be too high for the desirable speed range of the arrangement, and unstable speed-torque conditions would result at certain speeds and tractive efforts. The resistor 14 provides means whereby the value of the resistance of the resistors 11 and 12 may be determined without regard for the unstable speed-torque braking characteristics which would be obtained at certain speeds, thereby obtaining all of the protective compensating advantages of the resistors 11 and 12, and nevertheless obtaining a stabilizing action which will give inherently stable speed-torque characteristics at all operating speeds. The full line arrows shown in the drawing indicate the directions of the braking and excitation currents. The dotted line arrows opposite the resistor 14 indicates that this resistor carries a current value which is a function of the difference between the braking and the excitation current. Since this ordinarily will not be very large, if there is any difference at all, and since this resistor carries only the difference between the current in the local excitation circuit and the current in the braking circuit, this resistor will consume but a small amount of power. The resistor 14 will decrease the compensating effect of the balancing resistors 11 and 12, but nevertheless increase the resistance between the supply conductor 10 and the ground connection, thereby protecting the armatures A, B, C, D and E in the braking circuit and the armature F and the fields in the excitation circuit.

It will be observed that I have shown the resistor 13 as connected in shunt to the exciter field $f$ and also the series field $e$, so that the armature E will generate a lower potential than the armatures A, B, C and D. It will be apparent, however, that the resistor 13 could be connected merely around the field $f$ of the exciter, and that the field $e$ could carry the full excitation current, so that the armature E would develop the same potential as the other armatures. The intention of this feature of the figure is merely to suggest that in case it is desirable to shunt more of the fields than the exciter field, it may be done and still preserve the essential advantages of my invention.

In Fig. 2 I have shown the preferred form of my invention, and it will be apparent to those skilled in the art that the principal functions of this arrangement are substantially the same as the arrangement of Fig. 1. In Figure 2 the machines having armatures E and F and series field windings $e$ and $f$ respectively operate as a self-excited exciter for the fields of all of the machines. The resistor 11 is connected in series with the exciter armature E, the resistor 12 is connected in series with the exciter armature F, and the resistor 13 for varying the excitation of the exciters is connected in shunt to the field windings $e$ and $f$ of the exciters. In this arrangement the exciters may be fully loaded so that each exciter may deliver its full quota of braking effort. The resistors 11 and 12 also provide a means whereby the distribution of the load between the two exciters may be very accurately effected. The load of each exciter may be made the same as the load of the other exciter, or any predetermined relation between the two may be had as desired.

The resistor 14 has an effect on the value of the excitation current which is the opposite of the effect produced by the balancing resistors 11 and 12. Since any rush of current from ground to line tends to pass in the upward direction through the resistor 14, its effect is to increase the I. R. drop across the resistor 14 in the same direction as the generated potential, therefore assisting the generated voltage of the exciters. Thus, while the balancing resistors 11 and 12 tend to decrease the field current in response to an increased current flowing through the resistors, the resistor 14 tends to increase the field current. The resistor 14 thus makes it possible to obtain desirable speed-torque characteristics for wide speed ranges.

What I claim as new and desire to secure by Letters Patent of the United States, is:—

1. In a system of electric braking, a dynamo electric machine, separate means connected in a local circuit with the field windings of said machine for supplying the excitation thereof, a braking circuit including the armature of said machine, and means responsive to only the difference between the current in the said braking and local circuits for varying the speed-torque characteristics of said machine.

2. In a system of electric braking, a dynamo electric machine, separate means connected in a local circuit with the field winding of said machine for supplying the excitation thereof, a braking circuit including the armature of said machine, means for varying the speed-torque characteristics of said machine, and connections whereby the effect of the said means for varying the speed-torque characteristics of the machine is governed only by the difference between the current in the said braking and local circuits.

3. In a system of electric braking, a dynamo electric machine, separate means connected in a local circuit with the field windings of said machine for supplying the excitation current for said machine, a braking circuit including the armature of said machine, a resistor for varying the speed-torque characteristics of said machine, and connections whereby the current flowing through the resistor is the difference between the current in the said braking and local circuits.

4. In a system of electric braking, a plurality of dynamo electric machines having severally armature and field windings, a portion of said machines connected in a local circuit with the field windings of said machines for supplying the excitation thereof, the armatures of the remainder of the machines operatively connected to each other and to the said local circuit, a resistor in the local circuit, and connections whereby only the difference between the braking and the excitation current passes through said resistor.

5. In a system of electric braking, a plurality of dynamo electric machines having severally armature and field windings, a portion of said machines connected in a local circuit with the field windings of said machines for supplying the excitation thereof, a resistor in the local circuit, and connections whereby the resistor establishes a connection between the field windings of said machines and the remainder of the armatures and the difference between the braking and excitation current passes through said resistor.

6. In a system of electric braking, a dynamo electric machine having an armature and a field winding, a dynamo electric machine having an armature and a field winding operating as a self-excited exciter connected in a local circuit with the field windings of said machines, a resistor in the said local circuit, a braking circuit including the said resistor and the armatures of said machines, and means responsive to only the difference between the current in the said braking and local circuits for varying the speed-torque characteristics of the first mentioned dynamo electric machine.

7. The combination in a system of electric braking, of a plurality of similar dynamo electric machines having severally armature and field windings, a plurality of which operate as self-excited exciters with their armatures connected in multiple with each other in a local circuit with the field windings of the machines, a resistor in series with each exciter armature, a braking circuit including the armatures of said machines, and means responsive to the difference between the current in the said braking and local circuits for varying the speed-torque characteristics of the said combination of machines.

8. In a system of electric braking, a plurality of operatively connected dynamo electric machines having severally armature and field windings, a portion of said machines operating as a self-excited exciter for the remainder of the machines and connected in a local circuit with the field windings of the remainder of the machines, the armatures of the said remainder of the machines being connected to the local circuit, a plurality of resistors in the local circuit, and connections whereby the combined braking and excitation current passes through a portion of said resistors and the difference between the braking and the excitation currents passes through the remainder of the resistors.

9. In a system of electric braking, a plurality of dynamo electric machines having severally armature and field windings, a portion of said machines operating as a self-excited exciter connected in a local circuit with the field windings of said machines, the armatures of the remainder of said machines operatively connected to each other, a resistor establishing a connection between the said remainder of the armatures and the field windings of said machines, and a plurality of resistors in the said local circuit connected in multiple by the first resistor.

10. In a system of electric braking, a plurality of dynamo electric machines having severally armature and field windings, a portion of said machines connected in a local circuit with the field windings of said machines for supplying the excitation therefor, the armatures of the remainder of the machines operatively connected to each other and to the said local circuit, a common path for the braking and excitation current comprising a plurality of resistors, and a resistor establishing a multiple connection for the said plurality of resistors on the high potential ends of said plurality of resistors.

11. In a system of electric braking, a plurality of dynamo electric machines having severally armature and field windings, a portion of said machines connected in a local circuit with the field windings of said machines for supplying the excitation thereof, the armatures of the remainder of the machines operatively connected to each other, a resistor establishing a connection between the said remainder of the armatures and the field windings of the machines, a multiple circuit having a resistor in each of its branches connected to the first resistor and connections whereby the said multiple circuit forms a common path for the total braking and excitation current of said machines.

12. In a system of electric braking, a plurality of operatively connected dynamo electric machines having severally armature and field windings, a portion of said machines connected in a local circuit with the field windings of the machines for supplying the excitation therefor, a plurality of resistors connected in multiple relation forming a common path for the current through the remainder of the armatures and the excitation current for the field windings of said machines, and a resistor establishing the said multiple connection for the said plurality of resistors.

13. In a system of electric braking, a plurality of dynamo electric machines having severally armature and field windings, a plurality of which operate as exciters with their armatures connected in multiple with each other in series relation with the remainder of the armatures, the fields of all of the machines being connected in a local circuit with the exciter armatures, a resistor in series with each exciter armature, and a resistor through which the difference between braking and excitation current passes, establishing the multiple connection for the exciter armatures.

14. In a system of electric braking, a plurality of dynamo electric machines having severally armature and field windings, a plurality of which operate as exciters with their armatures connected in multiple with each other in series with the remainder of the armatures, the fields of all of the machines being connected in a local circuit with the exciter armatures, a resistor in series with each exciter armature, a resistor through which the difference between the braking and excitation current passes, establishing the multiple connection for the exciter armatures, and means for shunting a portion of the current in the said local circuit around the exciter field windings.

15. In a system of regenerative braking, a supply circuit, a plurality of dynamo electric machines having severally armature and field windings operatively connected to the supply circuit, a portion of said machines operating as self-excited exciters having their armatures connected in multiple with each other in series with the armatures of the remainder of the machines and in a local circuit including the field windings of the machines, a resistor in series with each exciter armature, and a resistor in the local circuit through which the difference between the braking and the current in the said local circuit passes.

16. The combination in a system of electric braking, of a plurality of similar dynamo electric machines having severally armature and field windings, a plurality of which operate as self-excited exciters with their armatures connected in multiple with each other in a local circuit with the field windings of the machines, a resistor in series with each exciter armature, a braking circuit including the armatures of said machines, a resistor for varying the speed-torque characteristics of said machines, and connections whereby the effect of the said resistor for varying the speed-torque characteristics is responsive to the difference between the current in the said braking and local circuits.

In witness whereof, I have hereunto set my hand this 10th day of September, 1920.

FRANKLIN H. PRITCHARD.